INVENTORS
RICHARD H. KROCK
EDWARD J. ZDANUK
BY
ATTORNEY 3,318,696
METHOD OF PRODUCING A POROUS TUNGSTEN STRUCTURE WITH AN IMPERVIOUS SKIN
Richard H. Krock, Peabody, and Edward J. Zdanuk, Lexington, Mass., assignors to P. R. Mallory & Co. Inc., Indianapolis, Ind., a corporation of Delaware
Filed Feb. 16, 1966, Ser. No. 527,902
10 Claims. (Cl. 75—208)

The present invention relates to powder metallurgy processing and more particularly to means and methods for fabricating structures having high density outer surfaces and a core of controlled porosity. The means and methods of the present invention utilize incomplete vacuum infiltration techniques of powder structures to produce structures having a tungsten core of controlled porosity surrounded by an integral with a dense, impervious, infiltrated tungsten skin.

Structures having a dense, impervious skin and a core of controlled porosity have several applications including, for example, ion emitters, permeable membranes, conduit means for fluids such as, for example, gases and liquids, fluid filters, and liquid cooled electrical contacts. The several applications require that the structure have a core of controlled porosity and a dense, impervious skin.

Fibrous materials such as paper have been used as filters, but the fibrous materials were found to be inadequate for high temperature and high pressure processes. Porous structures with a dense skin have been provided by several methods including the placing of sleeves thereabout, encapsulating, and the deposition of a dense material on the surface of porous structure. Some of the methods are difficult to carry out and maintain the desired porosity of the core while others may introduce deleterious material into the porous core which affects the permeability thereof.

It is known that complete and rapid impregnation of copper into tungsten can be conveniently and efficiently carried out in an atmosphere of hydrogen. The resultant structure is a pore-free, uniformly dense tungsten-copper composite. It is also known that when a similar procedure is carried out in a vacuum atmosphere, no impregnation of the copper into the tungsten occurs.

It was found by treating tungsten powder or presintered tungsten skeletons with particular chemical additives prior to the initiation of vacuum infiltration that surface infiltration of the tungsten specimen occurs while the core of the tungsten specimen remains porous. The infiltration of the tungsten specimen is incomplete, therefore, the resultant specimen consists of an interior porous tungsten region with a dense, composite skin of uniform depth which is impervious to fluids. The dense, composite skin consists of a tungsten structure infiltrated with copper or a copper alloy. The above-described armored tungsten structure has been produced in accordance with the present invention by incomplete vacuum infiltration of liquid copper or copper alloys into tungsten specimens such that penetration occurred to a shallow depth. The depth of penetration of the liquid matrix metal into the tungsten specimen is small in comparison to the thickness of the tungsten specimen. The depth of penetration by the liquid matrix metal can be controlled by varying the sintering time and temperature during vacuum infiltration.

Therefore, it is an object of the present invention to provide means and methods of producing armored structures in tungsten specimens.

Another object of the present invention is to provide an armored tungsten specimen having an impervious composite skin of predetermined depth which is integral with a porous core.

A further object of the present invention is to provide means and methods of preparing the surfaces of a sintered tungsten specimen so that the depth of infiltration by a liquid matrix metal or metals is small when compared to the thickness of the tungsten specimen.

A further object of the present invention is to provide a means and method of fabricating an armored tungsten specimen in both a practical and economical manner.

Yet still another object of the present invention is to provide an improved method of producing an integral tungsten specimen having a dense skin and a porous core.

Another object of the present invention is to provide an armored tungsten specimen in which copper is infiltrated into a powder tungsten specimen to a predetermined depth so as to provide an armored tungsten specimen.

The present invention, in another of its aspects, relates to novel features of the instrumentalities of the invention described herein for teaching the principal object of the invention and to the novel principles employed in the instrumentalities whether or not these features and principles may be used in the said object and/or in the said field.

With the aforementioned objects enumerated other objects will be apparent to those persons possessing ordinary skill in the art. Other objects will appear in the following description and appended claims.

Figure 1:
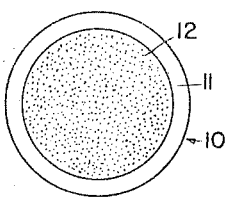
FIGURE 1 is a cross-sectional view of a tungsten specimen having its surface infiltrated with copper thereby producing a tungsten specimen having an impervious composite skin of uniform depth and a porous core.

Generally speaking, the means and method of the present invention relate to a porous tungsten specimen having an impervious tungsten-copper composite skin whose depth is small in comparison to the thickness of the tungsten specimen.

The method of making the tungsten specimen having armoured surfaces and a porous core comprises the steps of compacting the powdered tungsten particles into a desired specimen shape. The tungsten specimen is sintered and, thereafter, the sintered tungsten specimen has its surfaces treated with a chemical additive. If a more porous tungsten core is desired, loose tungsten powder may be immersed into the chemical additive and the powder placed in a mold thereby forming a tungsten specimen of desired shape without compacting and presintering of the specimen. The tungsten specimen is dried at about 150° centigrade for about 2 hours so as to condition the surfaces of the specimen prior to vacuum infiltration. The treated tungsten specimen is contacted with an infiltrant metal having a melting point temperature lower than that of tungsten, for example, copper or a copper alloy. The tungsten specimen and the infiltrant metal are placed in a vacuum atmosphere and heated so to vacuum infiltrate the surfaces of said tungsten specimen with the infiltrant metal thereby forming a sintered tungsten specimen having a pore-free tungsten-copper composite surface and a porous tungsten core. In addition, tungsten powder treated by immersion into the chemical additive prior to compacting and sintering in a vacuum may be used to fabricate armored tungsten structures.

More particularly, the present invention includes the steps of treating the surfaces of the tungsten specimen with a 10 percent solution of ammonium hydroxide or a solution of xylene. The tungsten powders may be treated with these solutions prior to pressing with substantially the same end product resulting if the initial sintering and infiltration are carried out simultaneously. The treated and sintered tungsten specimen, the treated green compact of tungsten powder, or the treated tungsten powder contained within a forming mold are dried and then are contacted with copper or a copper alloy. The tungsten specimens and the copper or the copper alloy are placed in a vacuum of about $10^{-5}$ torr and are heated to a temperature of a few hundred degrees centigrade above the melting point of the impregnant for about 20 minutes so as to vacuum infiltrate said surfaces of said tungsten specimens with said copper thereby forming tungsten structures having pore-free armored surfaces about a porous core.

Another embodiment of the present invention includes the steps of compacting powdered tungsten particles into a desired specimen shape and sintering the specimen in an atmosphere of hydrogen. The sintered tungsten specimen is contacted with copper containing hydrogen. The tungsten specimen and the hydrogen containing copper are placed in a vacuum atmosphere and heated so as to vacuum infiltrate the surfaces of the specimen with the hydrogen containing copper thereby forming a tungsten specimen having pore-free armored surfaces about the porous core.

In carrying out the present invention, it was found that for the tungsten-copper system, treating with highly volatile organic solvents and inorganic salt solutions either the surface of a sintered tungsten specimen, or tungsten powder prior to pressing and sintering, or tungsten powder prior to placing it in a mold followed by drying and vacuum infiltration with copper results in the copper infiltrating to a predetermined depth of the tungsten specimens. The finished workpieces have an impervious composite skin of tungsten-copper and a porous center portion of tungsten.

Powdered tungsten having any particle size may be utilized depending only on the porosity required to give the characteristics desired such as the fluid flow rate necessary to sustain a fluid system. It will be noted that a tungsten specimen fabricated from tungsten powder having a particle size of about 100 microns will provide a lower fluid flow rate than a tungsten specimen fabricated from tungsten powder having a particle size of about 200 microns or larger, if the same overall density is obtained.

The infiltration of a treated tungsten specimen is performed with a metallic material such as copper or an alloy thereof in the presence of heat and a vacuum. It will be noted that the metallic infiltrant has a melting point temperature lower than the melting point temperature of the tungsten specimen. The copper or copper alloys can be heated and melted in a means separate and distinct from the means containing the tungsten specimen, and are then brought into contact with the specimen in a liquid or semi-liquid form.

The tungsten specimen is treated with a chemical additive such as a 10 percent solution of ammonium hydroxide or xylene and then dried at about 150° C., for about 2 hours. This procedure conditions the surfaces of the tungsten specimen. Copper or a copper alloy is brought into contact with the treated surfaces of the tungsten specimen and then heated to about 1250° centigrade for approximately 20 minutes at a pressure of about $10^{-5}$ torr. The copper or copper alloy infiltrates into the pores of the tungsten specimen to a predetermined depth so that the tungsten specimen has an impervious composite skin about its porous core. It is thought that the infiltration of the copper into the surface pores of the tungsten specimen is due to either raising the surface energies of the liquid or of the solid, or by lowering the surface energy of the interface between the liquid and the solid. In addition to copper, alloys of copper such as copper-indium, copper-bismuth, copper-tin and the like have been used to surface infiltrate sintered tungsten specimens.

Referring to the drawings, FIGURE 1 shows a sintered tungsten specimen 10 having an impervious composite skin 11 and a porous core 12. The impervious composite skin 11 includes a porous structure of tungsten wherein the pores are filled with an infiltrant such as copper 13. It was found that alloys of copper such as copper-indium, copper-bismuth, and copper-tin were satisfactory infiltrants.

Figure 2:
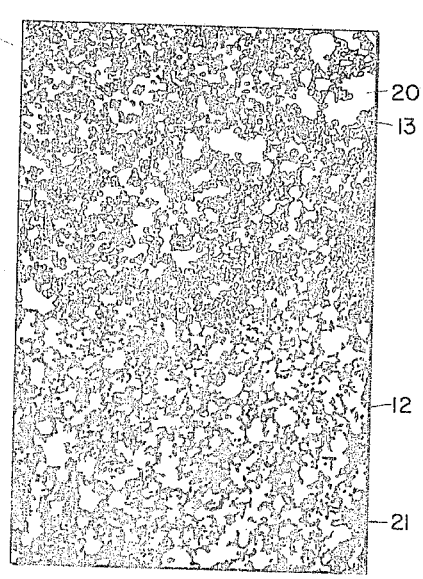
FIGURE 2 is a photomicrograph of 500 magnifications illustrating the junction between an impervious composite skin of tungsten-copper and a porous core of tungsten.

FIGURE 2 of the drawings illustrates the junction between the impervious composite skin 11 composed of tungsten-copper and a porous core 12 composed of sintered tungsten particles. The areas 20 are tungsten particles, the stippled areas 13 are copper, and the dark areas 21 are voids between the tungsten particles.

In addition, surface infiltration of tungsten specimens has been produced by sintering the tungsten specimen in a hydrogen atmosphere prior to the vacuum infiltration and using as the infiltration stock copper containing about 4 parts per million of hydrogen. The tungsten specimen contained a hydrogen concentration of about 2 parts per million prior to vacuum treatment. Vacuum infiltration with vacuum sintered tungsten (hydrogen concentration less than 0.3 part per million) and vacuum outgassed copper show no penetration of the tungsten specimen.

Figure 3:
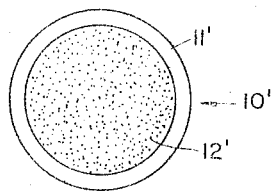
FIGURE 3 is a cross-sectional view of a tungsten specimen sintered in hydrogen and infiltrated with copper containing hydrogen thereby producing a tungsten specimen having an impervious skin of uniform depth and a porous core.

FIGURE 3 of the drawings shows a sintered tungsten specimen 10' having an impervious composite skin 11' and a porous core 12'. The tungsten specimen was sintered in a hydrogen atmosphere. The resultant tungsten specimen contained a hydrogen concentration of about 2 parts per million prior to vacuum treatment. The impervious skin includes a porous structure of tungsten wherein the pores are filled with an infiltrant such as copper having a hydrogen concentration of about 4 parts per million prior to vacuum treatment.

The following Examples 1 to 13 are illustrative of the preparation of a tungsten specimen having a composite skin of tungsten-copper or tungsten-copper alloy.

*Example 1*

The surfaces of a sintered skeleton of tungsten having a particle size of about 3.5 to 4.5 microns were immersed into a 10 percent solution of ammonium hydroxide and then dried at about 150° centigrade for about 2 hours. This procedure conditions the surfaces of the tungsten body. Copper was brought into contact with the surfaces of the tungsten skeleton. The tungsten skeleton was subjected to a vacuum infiltration process at 1250° centigrade for about 20 minutes at a pressure of about $10^{-5}$ torr. The flow of the copper into the tungsten skeleton produced an impervious composite skin of substantially uniform thickness over the tungsten skeleton. Typical skin thicknesses in the range of .001 to .030 inch were achieved. As disclosed hereinbefore, the depth of infiltration can be controlled to some extent by varying the sintering time and temperature.

*Example 2*

The procedure of Example 1 was followed in order to surface infiltrate the tungsten skeleton with each of the copper alloys of copper-indium, copper-bismuth, and copper-tin.

*Example 3*

The surfaces of a sintered skeleton of tungsten having a particle size of about 10 microns were immersed in xylene solution and then dried at about 150° centigrade for about 2 hours. Copper was brought into contact with the surfaces of the tungsten. The tungsten skeleton was subjected to a vacuum infiltration process at 1250° centigrade for about 20 minutes at a pressure of about 10⁻⁵ torr. The flow of the copper into the tungsten skeleton produced an impervious skin of substantially uniform thickness over the porous tungsten skeleton. Typical skin thicknesses in the range of .001 to .030 inch were achieved. As disclosed hereinbefore, the depth of infiltration can be controlled to some extent by varying the sintering time and temperature.

*Example 4*

The procedure of Example 3 was followed in order to surface infiltrate the tungsten skeleton with each of the copper alloys of copper-indium, copper-bismuth, and copper-tin.

*Example 5*

Tungsten powder having a particle size of about 3.5 to 4.5 microns was immersed in a 10 percent solution of ammonium hydroxide. The tungsten powder was dried at about 150° centigrade for about 2 hours. The tungsten powder is compacted at any suitable pressure to provide a green compact sturdy enough to be handled. Copper was brought into contact with the green compact. The green compact was subjected to a simultaneous sintering and infiltration process at 1250° centigrade for about 20 minutes at a pressure of about 10⁻⁵ torr. The flow of copper into the tungsten compact produced an impervious composite skin of substantially uniform thickness over the tungsten compact. Typical skin thicknesses in the range of .001 to .030 inch were achieved. As disclosed hereinbefore, the depth of infiltration can be controlled to some extent by varying the sintering time and temperature.

*Example 6*

The procedure of Example 5 was followed in order to surface infiltrate the tungsten compact with each of the copper alloys of copper-indium, copper-bismuth, and copper-tin.

*Example 7*

Tungsten powder having a particle size of about 3.5 to 4.5 microns was immersed in a solution of xylene. The tungsten powder was dried at about 150° centigrade for about 2 hours. The tungsten powder is compacted at any suitable pressure to provide a green compact sturdy enough to be handled. Copper was brought into contact with the green compact. The green compact was subjected to a simultaneous sintering and infiltration process at 1250° centigrade for about 20 minutes at a pressure of about 10⁻⁵ torr. The flow of copper into the tungsten compact produced an impervious composite skin of substantially uniform thickness over the tungsten compact. Typical skin thicknesses in the range of .001 to .030 inch were achieved. As disclosed hereinbefore, the depth of infiltration can be controlled to some extent by varying the sintering time and temperature.

*Example 8*

The procedure of Example 7 was followed in order to surface infiltrate the tungsten compact with each of the copper alloys of copper-indium, copper-bismuth, and copper-tin.

*Example 9*

Tungsten powder having a particle size of about 10 microns was immersed in a 10 percent solution of ammonium hydroxide. The tungsten powder was dried at about 150° centigrade for about 2 hours. The tungsten powder was placed in a suitable mold thereby forming the tungsten particles into the desired shape. Copper was brought into contact with the surfaces of the tungsten shape. The tungsten shape was subjected to a simultaneous sintering and infiltration process at 1250° centigrade for about 20 minutes at a pressure of about 10⁻⁵ torr. The flow of copper into the tungsten shape produced an impervious composition skin of substantially uniform thickness over the tungsten shape. Typical skin thicknesses in the range of .001 to .030 inch were achieved. As disclosed hereinbefore, the depth of infiltration can be controlled to some extent by varying the sintering time and temperature.

*Example 10*

The procedure of Example 9 was followed in order to surface infiltrate the tungsten body with each of the copper alloys of copper-indium, copper-bismuth, and copper-tin.

*Example 11*

Tungsten powder having a particle size of about 10 microns was immersed in a solution of xylene. The tungsten powder was dried at about 150° centigrade for about 2 hours. The tungsten powder was placed in a suitable mold thereby forming the tungsten particles into the desired shape. Copper was brought into contact with the surfaces of the tungsten shape. The tungsten shape was subjected to a simultaneous sintering and infiltration process at 1250° centigrade for about 20 minutes at a pressure of about 10⁻⁵ torr. The flow of copper into the tungsten body produced an impervious composite skin of substantially uniform thickness over the tungsten shape. Typical skin thicknesses in the range of .001 to .030 inch were achieved. As disclosed hereinbefore, the depth of infiltration can be controlled to some extent by varying the sintering time and temperature.

*Example 12*

The procedure of Example 11 was followed in order to surface infiltrate the tungsten shape with each of the copper alloys of copper-indium, copper-bismuth, and copper-tin.

*Example 13*

A tungsten powder having a particle size of about 10 microns was pressed at a suitable pressure to provide a green compact sturdy enough to be handled. Sintering of the compact was carried out in a hydrogen atmosphere at about 1250° centigrade for about 10 minutes. Stock copper containing about 4 parts per million of hydrogen was brought into contact with the sintered body of tungsten. The sintered tungsten body was subjected to a copper vacuum infiltration process at about 1250° centigrade for about 20 minutes at pressures of about 10⁻⁵ torr. The flow of copper into the tungsten body produces an impervious skin of substantially uniform thickness. Typical skin thicknesses in the range of .001 to .030 inch were achieved. As disclosed hereinbefore, the depth of infiltration can be controlled to some extent by varying the sintering time and temperature.

The present invention is not intended to be limited to the disclosure herein, and changes and modifications may be made by those skilled in the art without departing from the spirit and scope of the present invention. Such modifications and variations are considered to be within the purview and scope of the present invention and the appended claims.

Having thus described our invention, we claim:

1. A method of making a tungsten specimen having an armored surface and a porous core comprising the steps of: treating tungsten powder with a chemical additive; drying said treated tungsten powder at about 150° centigrade for about 2 hours so as to condition said tungsten powder; forming said conditioned tungsten powder into a desired specimen shape; contacting said conditioned surfaces of said tungsten specimen with a metal having a melting point temperature lower than that of tungsten; placing said tungsten specimen and said infiltrant metal in a vacuum atmosphere; and heating said tungsten specimen and said infiltrant metal so as to simultaneously sinter said tungsten specimen and to infiltrate the surfaces of said tungsten specimen with said infiltrant metal thereby forming a sintered tungsten specimen having pore-free armored surfaces and a porous core.

2. The method according to claim 1 wherein said chemical additive for treating said tungsten powder is a 10 percent solution of ammonium hydroxide.

3. The method according to claim 1 wherein said chemical additive for treating said tungsten powder is xylene.

4. A method of making a tungsten specimen having an armored surface and a porous core comprising the steps of: compacting powdered tungsten particles into a desired specimen shape; sintering said compacted tungsten specimen; treating said sintered tungsten specimen with a chemical additive; drying said sintered tungsten specimen at about 150° centigrade for about 2 hours; contacting said conditioned surfaces of said sintered tungsten specimen with an infiltrant metal having a melting point temperature lower than that of tungsten; placing said tungsten specimen and said infiltrant metal in a vacuum atmosphere; and heating said tungsten specimen and said infiltrant metal so as to vacuum infiltrate the surfaces of said tungsten specimen with said infiltrant metal thereby forming a tungsten specimen having pore-free armored surfaces and a porous core.

5. The method according to claim 4 wherein said chemical additive for treating said surfaces of said tungsten specimen is a 10 percent solution of ammonium hydroxide.

6. The method according to claim 4 wherein said chemical additive for treating said surfaces of said tungsten specimen is xylene.

7. The method according to claim 4 wherein said contact metal for surface infiltrating said tungsten specimen is selected from the group consisting of copper, copper-indium, copper-bismuth, and copper-tin.

8. The method according ot claim 4 wherein said vacuum atmosphere has a pressure of about $10^{-5}$ torr.

9. The method according to claim 4 wherein said heating is to a temperature of about 1250° centigrade for about 20 minutes.

10. A method of making a tungsten specimen having an armored surface and a porous core comprising the steps of: compacting powdered tungsten particles into a desired specimen shape; sintering said tungsten specimen in an atmosphere of hydrogen; contacting the surfaces of said tungsten specimen with copper containing hydrogen; placing said tungsten specimen and said hydrogen containing copper in a vacuum atmosphere and heating said tungsten specimen and said hydrogen containing metal so as to vacuum infiltrate said tungsten specimen with said hydrogen containing copper thereby forming a tungsten specimen having pore-free armored surfaces and a porous core.

References Cited by the Examiner
UNITED STATES PATENTS 2,669,008    2/1954    Levi.
2,845,346    7/1958    Scanlon _____ 75—208

FOREIGN PATENTS 661,031    11/1951    Great Britain.

CARL D. QUARFORTH, *Primary Examiner.*

A. J. STEINER, *Assistant Examiner.*